United States Patent [19]

Hamada et al.

[11] Patent Number: 4,949,336
[45] Date of Patent: Aug. 14, 1990

[54] MULTI-SLOT ACCESS SYSTEM

[75] Inventors: Takuji Hamada, Hitachiota; Masahiro Takahashi; Katsuhiko Yoneda, both of Hitachi; Masakazu Okada, Katsuta, all of Japan

[73] Assignee: Hitachi, Ltd., Tokyo, Japan

[21] Appl. No.: 218,130

[22] Filed: Jul. 13, 1988

[30] Foreign Application Priority Data

Jul. 15, 1987 [JP] Japan .................................. 61-174672

[51] Int. Cl.⁵ ............................................... H04J 3/00
[52] U.S. Cl. ................................ 370/85.2; 370/85.15; 340/825.05
[58] Field of Search ....................... 370/89, 94, 95, 85; 340/825.5, 825.51, 825.05

[56] References Cited

U.S. PATENT DOCUMENTS 4,516,240  5/1985  Kume et al. ........................... 370/94
4,612,637  9/1986  Davis et al. ........................... 370/95
4,685,105  8/1987  Shikama et al. ....................... 370/89

FOREIGN PATENT DOCUMENTS 62-88455  4/1987  Japan .

OTHER PUBLICATIONS

T. Kawabata et al, "Ring-Type Optical Network of 100 Mbyts/Sec. Interlinking Bus-Type Networks", Nikkei Electronics, Dec. 5, 1983, pp. 173-199.

Primary Examiner—Douglas W. Olms
Assistant Examiner—Alpus H. Hsu
Attorney, Agent, or Firm—Antonelli, Terry, Stout & Kraus

[57] ABSTRACT

In an annular transmitting system including a ring-like transmission path realized by interconnecting serially a plurality of transmission stations in an annular form, at least one of the transmissions stations generating repetitively a transmitting frame constituted by a plurality of transmission units referred to as time slots, the frame being circulated along the transmission path, wherein transmission of information among transmission stations is performed in such a manner in which each of the transmission stations having a request to send information inserts the information in the slots by dividing the information, which information is ultimately fetched by the transmission station destined to receive that information, a multi-slot access system in which each of the time slots is provided with an area indicating whether the associated time slot is "free" or "busy", wherein the transmission station having a request to send information determines that the sending of the information is enabled when it is detected that one time slot located at a particular position within the transmitting frame is "free" or when it is detected that the time slot succeeding immediately to the "busy" slot is "free", to thereby set successively those usable time slots which succeed to the detected "free" time slot to the "busy" state and insert the information in these usable time slots.

2 Claims, 7 Drawing Sheets

MULTI-SLOT ACCESS SYSTEM

BACKGROUND OF THE INVENTION

The present invention generally relates to a transmission system in a ring-like local area network. More particularly, the invention is concerned with a slot access system suited advantageously for a consolidation type local area network capable of transmitting both periodically generated information and burst-type information mixedly by adopting a slot multiplex transmission.

A transmission system in which burst-type information such as messages for inter-computer communication is transmitted by dividing the information into predetermined transmission units referred to as time slots has heretofore been known, as is disclosed Kawabata et al's article entitled "Ring-Type Optical Network of 100 Mbits/Second Interlinking Bus-Type Networks" contained in Japanese literature "Nikkei Electronics" published on Dec. 5, 1983. According to this system, each of the time slots is provided at the header thereof with an indicator for indicating whether the associated time slot is in the "free (idle)" state or in the "busy (occupied)" state, wherein the transmission apparatus or station having a request to send data fetches the "free (idle)" time slot when data corresponding to one time slot has been prepared to thereby send the data by placing it in the acquired time slot. This system is certainly advantageous in that transmission suffering scarcely time lag can be realized.

As another system known in the prior art, there can be mentioned a transmission system disclosed in Japanese Patent Application No. 88455/1987 (JP-A-62-88455). According to this system, one of all the time slots is allocated with information indicating permission of transmission at the header portion, wherein the transmission apparatus or station having a request to send information or data first acquires the time slot having the transmission enabling information and then uses successively the time slots succeeding to the acquired time slot for thereby transmitting the information at one burst. With this known system, high-speed transmission can be carried out.

Both the transmission systems mentioned above have merits and demerits, respectively. Accordingly, it is desirable to adopt these transmission systems properly and selectively in dependence on the networks to which they are practically applied. To this end, however, logics of control of the transmission and management thereof will have to be made as compatible or common as possible between both systems. However, such compatibility is difficult to realize because of difference in the format for transmission between these systems, giving rise to a problem.

SUMMARY OF THE INVENTION

An object of the present invention is to provide a slot access system in which a same transmission format can be utilized both for arbitrary occupation of the time slot and successive or continuous occupation of the successive time slots to thereby facilitate realization of control and management or monitoring logics in common to both cases mentioned above.

In view of the above and other objects which will be more apparent as the description proceeds, there is provided according to an aspect of the present invention a multi-slot access system in which with a view to realizing an implicit token pass means in conjunction with the occupation of successive time slots, such concept is adopted according to which a "free (or idle)" slot succeeding immediately to a "busy (or occupied)" slot is decided to represent the sending enabling information when that "free" slot is detected in the course of transmission performed over a ring-like transmission path, while a "free" slot located at a particular or specific position within a transmission frame is decided to be the sending enabling signal in the case where no transmission takes place over the ring transmission path. According to the inventive multi-slot access system, continuity of information to be transmitted from any sender apparatus or station can be ensured without need for placing the token information in the slot. Accordingly, in either case, one and the same format for transmission can be employed, whereby realization of compatibility of the control and management or monitoring logics mentioned above is facilitated.

According to the teaching of the present invention, it is thus possible to render it unnecessary to place the token information into the slot even in the transmission of information through occupation of successive time slots, whereby the same transmission format as the one employed in the transmission of information by using arbitrary time slots can be used, which in turn means that realization of the compatibility of control and management logics is facilitated.

DESCRIPTION OF THE PREFERRED EMBODIMENTS

Now, the invention will be described in detail in conjunction with exemplary embodiments by referring to the drawings.

Figure 1:
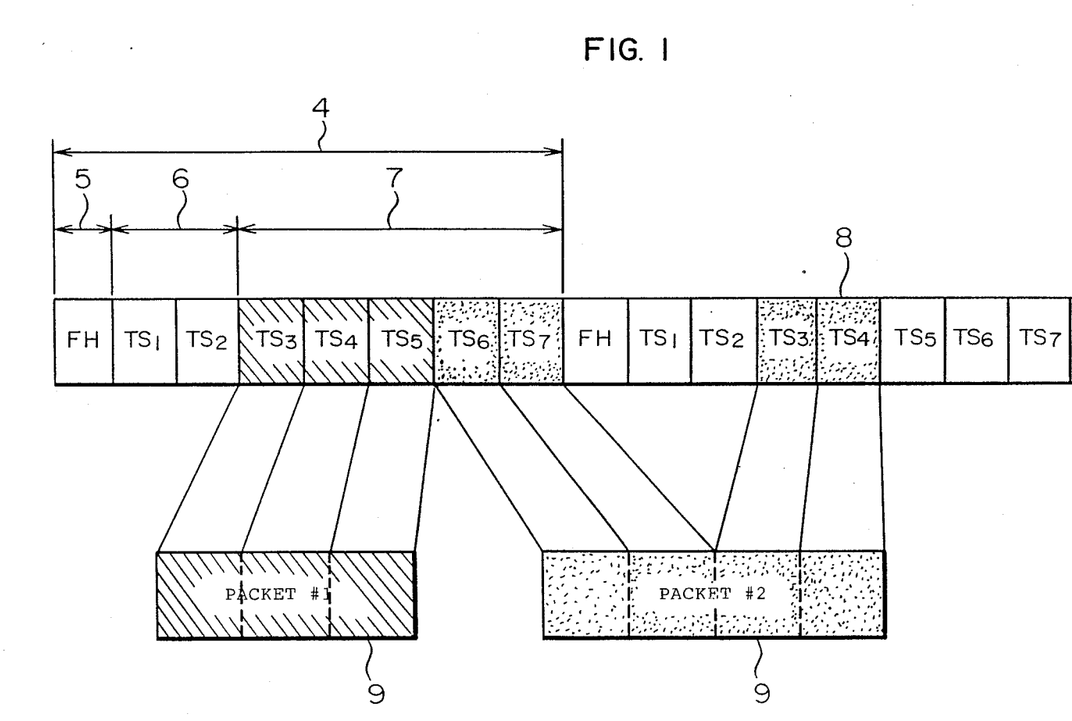
FIG. 1 is a view showing an example of frame structure of information to be sent in a ring-like transmission system to which the present invention is applied.

FIG. 1 illustrates an example of structure of information transmitted in a ring-like transmission network system to which the teaching of the present invention is applied and demonstrates features of the system. For enabling the transmission of both periodical information and burst-type information in a mixed manner, there is adopted as the multiplexing system a synchronous time division multiplexing system (referred to STDM in abbreviation) which is based on the employment of time slots. According to this STDM system, a transmission frame 4 constituted by a plurality of time slots 8 (although eight time slots are shown in the case of the illustrated embodiment, the number of the slots may be selected arbitrarily) is transmitted repeatedly and circulatively on and along a transmission line or path. This operation is controlled by one of the transmission apparatuses or stations installed within the system. The start or leading time slot of the frame 4 is termed as a frame header 5 which is not usually used for the sending of information but utilized for the purpose of management of the network and maintenance of periodicity. The remaining time slots are employed for the transmission of information. In this connection, two slot areas 6 and 7 are prepared distinctively for the transmission of the periodically generated information on one hand and the burst-type information on the other hand, respectively. In the case of the illustrated example, the time slots $TS_1$ and $TS_2$ belongs to the transmission area 6 while the time slots $TS_3$, $TS_4$, $TS_5$, $TS_6$ and $TS_7$ are allocated to the transmission area 7. However, such division of areas and allocation of the time slots are only by way of example. Other types of allocations of the time slots can of course be adopted. In connection with the transmission of the burst-type information with which the present invention is concerned, a request to send information as issued by a device or machine connected to the transmission apparatus or station constituting a part of the transmission system is realized on the basis of a transmission unit referred to as the packet 9. Every transmission station connected to the network system can transmit respective packet in the form of plural time slots into which the packet is divided. By introducing the implicit token pass function, the time slots occupied by each transmission station continue successively on the packet basis and can never be mixed with the time slots of the other packet. In the case of the example illustrated in FIG. 1, it is assumed that two transmission apparatuses or stations issue simultaneously the respective requests to send information and that the packet #1 for transmission needs to occupy an area corresponding to three time slots while the packet #2 needs to occupy an area corresponding to four time slots. At first, the packet #1 is sent out. Upon completion of this transmission, the packet #2 starts to be sent out. In the case of the transmission of the packet #2, it is assumed that the area for the burst-type information comes to an end once at the time point when two time slots have been sent out. Thus, the transmission is temporarily interrupted and the arrival of the succeeding transmission frame having the sending enabling area is waited for. Upon arrival of such transmission frame, the remaining information of the packet #2 can then be sent out.

Figure 2:
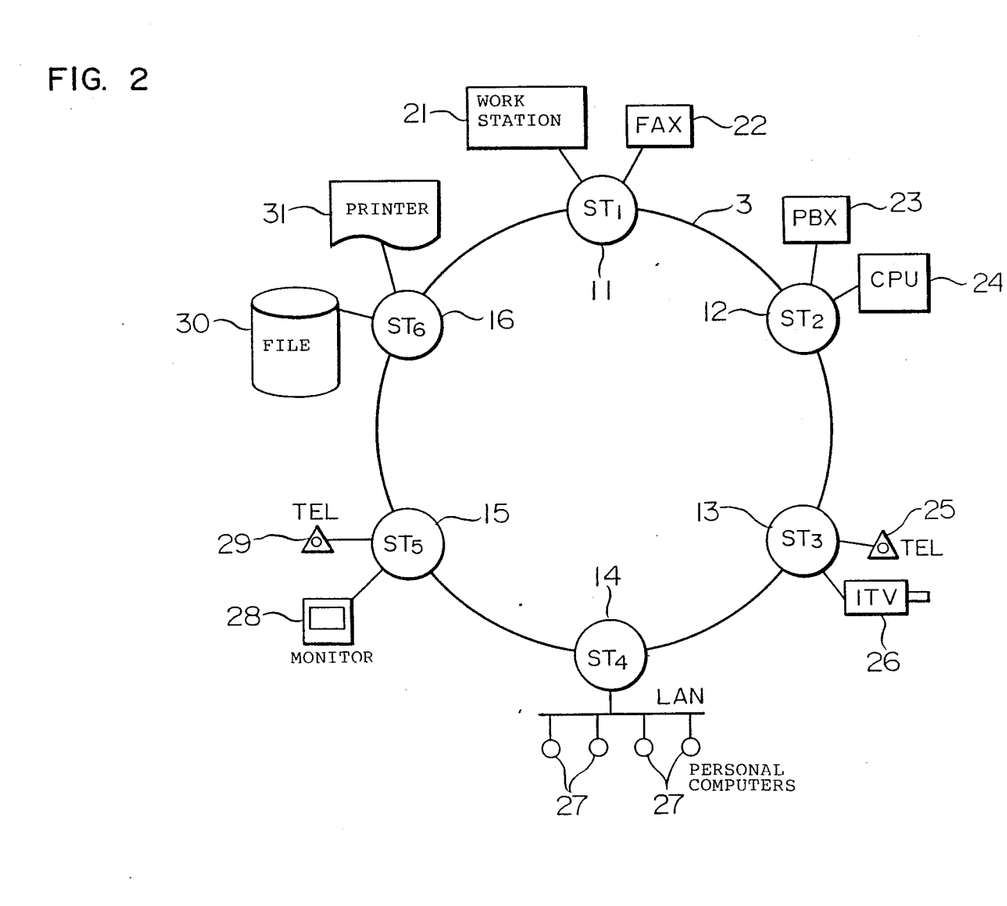
FIG. 2 is a schematic view showing, by way of example, a general arrangement of an annular transmission system to which the invention can be applied.

FIG. 2 shows a general arrangement of an annular transmission system to which the invention can be applied. As is seen in this figure, various information processing devices or machines 21 to 32 installed dispersively at various locations in premises such as a factory, building, campus of a university or the like are connected to the system through respective transmission apparatuses or stations 21 to 31 for communicating with one another. These transmission stations 21 to 31 are interconnected by means of a bit-serial transmission path 3 in an annular configuration to realize a ring-like network.

With the system shown in FIG. 2, a multi-media consolidating network is envisaged so as to be capable of accommodating mixedly traffics of different characteristics.

The slot access scheme according to the present invention is suited for application to the data transmission system mentioned above. For the communication with an ITV (industrial television) 26, a monitor 28, telephones 25 and 29, FAX (facsimile terminal equipment) 22, a PBX (private branch exchange) 23 or the like which requires transmission with a long holding time periodically, a number of slots as required are allocated in precedence to the transmission for allowing the corresponding area to be exclusively used in the transmission. On the other hand, for the communication to or from a computer 24, a work station 21, personal computers 27 by way of an associated local area network (LAN) subsystem, a filing unit 30, a printer 31 or the like which requires burst-type data transmission with a short holding time, it is possible to allocate an arbitrary number of "free or idle" time slots for use by each of the equipment mentioned above. Further, allocation of the areas to be used for both types of traffics mentioned above can be freely established on the time-slot basis in accordance with the system.

Figure 3:
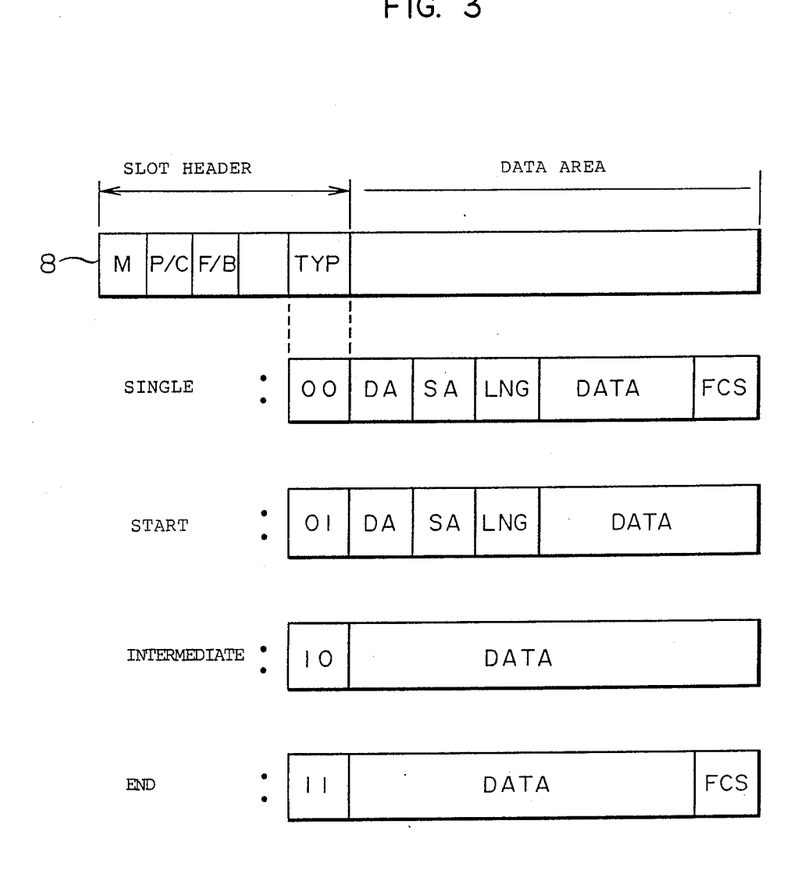
FIG. 3 is a view illustrating formats of time slots employed for transmitting the burst-type information.

FIG. 3 shows a typical example of a format of the time slot destined for transmission of the burst-type information.

The header portion contains the data mentioned below.

(1) Monitor Bit (M)

This information is used for the monitoring purpose to prevent the instant time slot from circulating incorrectly along the ring transmission path due to some sort of obstruction.

(2) Burst/Cyclical Bit (P/C)

This information indicates types of information to be transmitted with the instant time slot.

(3) Free/Busy Bit (F/B)

This information indicates whether the instant slot is free (idle) or busy (occupied).

(4) Slot Type (TYP)

When transmission is performed by occupying successive time slots, this information TYP indicates whether the information stored in the data area is to be located at the start or at an intermediate portion or at the end of the packet or is single information (i.e. the start and simultaneously the end information in the shortest packet). Parenthetically, in the case of the transmission based on the arbitrary occupation of the slot, only the single type slot is used.

Four species of data areas illustrated in FIG. 3 are employed in dependence on the types of the time slot mentioned just above. The data items which can be contained in the data area are as follows:

(1) Destination Address (DA)

The address of the destination which is to receive the instant packet.

(2) Sender Address (SA)

The address of the transmission station in which the instant packet originates.

(3) Data Length (LNG)

The length of data portion of the instant packet.

(4) Data Contents (DATA)

Contents of the data portion of the instant packet.

(5) Error Check (FCS)

Code for checking error of transmission within the instant packet.

Figure 4:
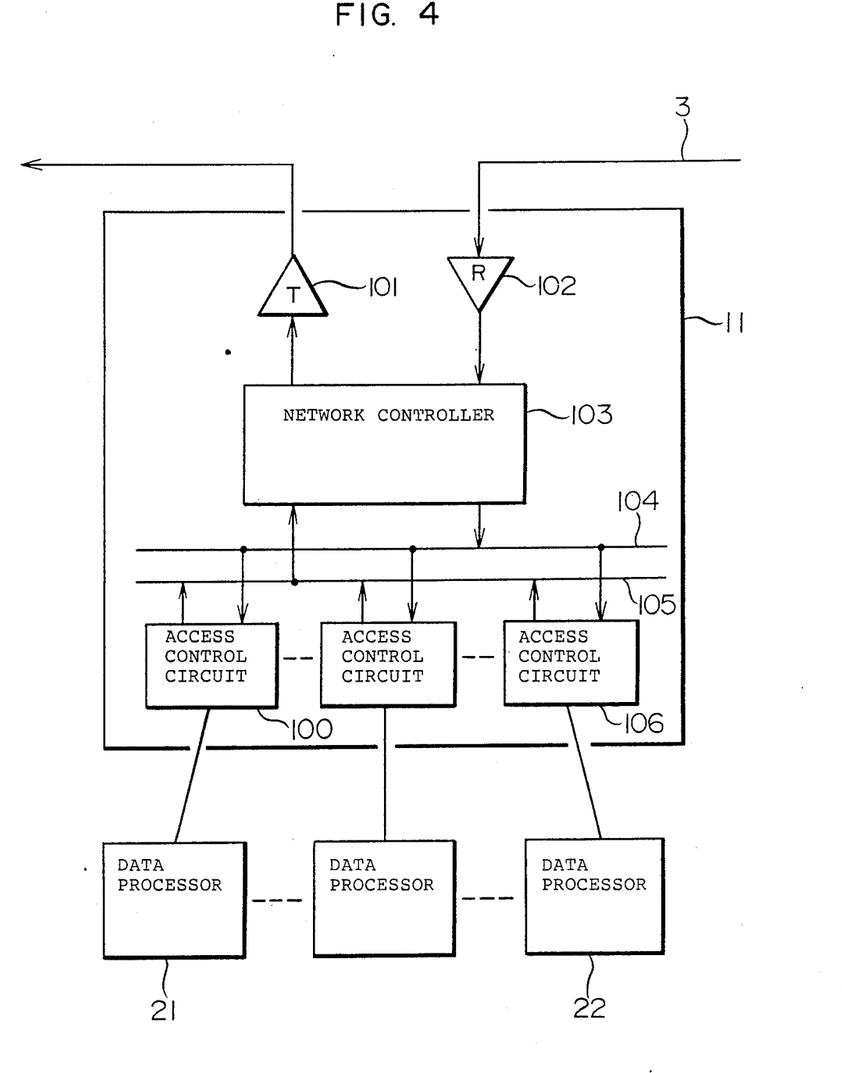
FIG. 4 is a view showing a hardware structure of a transmission apparatus or station.

FIG. 4 shows a hardware arrangement of the transmission apparatus or station taking as an example the transmission station 11 shown in FIG. 2, being understood that other transmission stations are implemented in the same structure. As will be seen in this figure, the transmission station 11 includes the following components.

(1) Receiver (102)

This receiver 102 serves to convert the incoming signal from the transmission line into a digital signal and has functions of signal amplification, generation of bit timing, reconstitution of the digital signal, decoding and others. In case the transmission line 3 is constituted by an optical fiber cable, the receiver 102 is additionally imparted with light-to-electricity converting function.

(2) Transmitter (101)

In contrast to the receiver 102, the transmitter 101 serves for converting the digital signal to the signal form suited for transmission over the transmission path 3 and has functions of encoding, signal driving, electricity-to-light conversion and others.

(3) Network Controller (103)

The network controller 103 has functions for generation of the frame for transmission composed of plural time slots, detection and adjustment of delay involved in the circulation along the ring transmission path 3, and others. Additionally, the network controller 103 controls the configuration of the network such as realization of by-pass and loop-back (in the case where the transmission path is duplicated).

(4) Internal Buses (104, 105)

These buses 104 and 105 serve for information transfer between the network controller 103 and access controllers 100, 106 mentioned below for allowing a plurality of devices or machines to be connected to the instant transmission station. The bus 104 serves for reception of information with the bus 105 serving for the transmission. Additionally, a bus for the control purpose is provided although not shown.

(5) Access Controller (100, 106)

The access controllers are provided for each of the devices or machines 21, 22 connected to the transmission station of concern and serves for functions of interfacing with the connected device, buffering of the signal and access control for the reception and the transmission.

The incoming information from the transmission line 3 enters the network controller 103 by way of the receiver 102. In the state where neither bypass is formed nor the transmission is being performed, the incoming information is transferred straightforwardly to the transmitter 101 to be again sent out onto the transmission line 3. Simultaneously, information of the same content is outputted to the receiving bus 104, whereby the access controller 100 and 106 can detect the received information. When the access controller 100 for the transmission of burst information detects the information destined for itself from the train of received information, the access controller 100 fetches the contents of that information to ultimately transfer it to the associated device or machine 21. The transmitting operation is carried out through the reverse procedure. At first, information to be transmitted is transferred from the connected device or machine 21 to the associated access controller 100. When the right of transmission is acquired by the access controller 100, the information is outputted onto the bus 105 for transmission at a time point corresponding to the pertinent portion of the frame for transmission. At that time, the repeating operation of the network controller 103 is inhibited, which controller is then commanded to select the content on the bus 105 for the transmission. (To this end, the control bus not shown is used).

Figure 5:
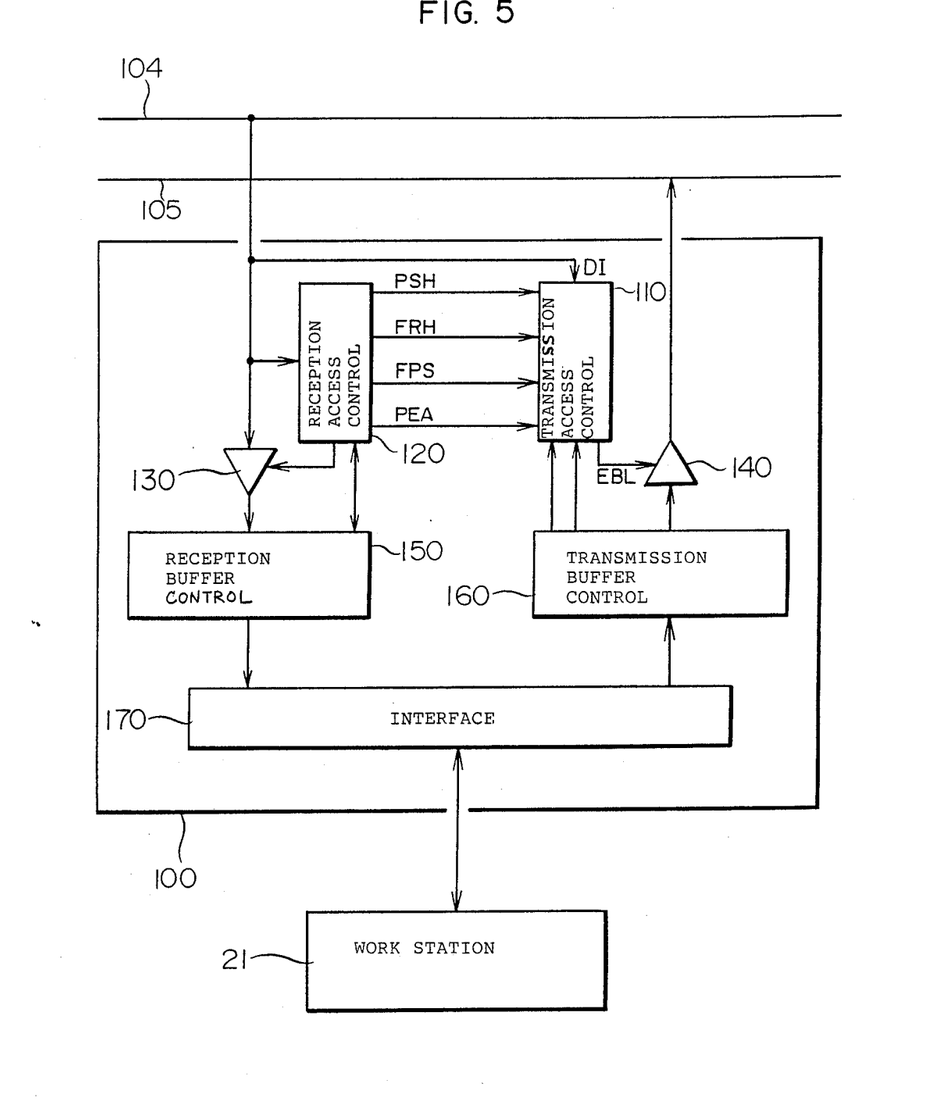
FIG. 5 is a view showing a hardware structure of an access controller (100) for transmission of burst-type information employed in the station shown in FIG. 4.

FIG. 5 shows in further detail a hardware structure of the access controller 100 for transmitting the burst-type information. The information on the bus 104 for reception is supplied to a buffer control circuit 150 for reception through an access control circuit 120 for reception, an access control circuit 110 for transmission and a gate circuit 130. Upon determination of the access control to be performed for the reception, the gate circuit 130 is so controlled that the information of the data area of the slot which is destined to the device or machine 21 connected to the access controller 100 of concern is transferred to the reception buffer control circuit 150. The reception access controller 100 has a function to generate various timing signals for transmission as required by the transmission access control circuit 110. The reception buffer control circuit 150 transfers the stored information to the connected device or machine (a work station 21 in the case of the illustrated example) by way of an interface circuit 170.

On the other hand, in the case of transmission, information to be sent out is transferred from the connected device or machine (e.g. work station 21) to the transmission buffer control circuit 160 through the interface circuit 170. In response to the command for transmission, the transmission buffer control circuit 160 prepares a format for the division and allocation of time slots and informs the transmission access control circuit 110 of the appearance of a request to send information. The transmission access control circuit 110 in turn starts operation for acquiring the right of transmission on the basis of the transmission timing signal supplied from the reception access control circuit 120 and the contents on the receiving bus 104. When the right of transmission has been acquired, the open/close operation of the gate circuit 140 is then so controlled that the information from the transmission buffer control circuit 160 can be inserted in the frame for transmission at the pertinent portion thereof. Upon return of the slot as occupied after having circulated a round along the ring transmission path 3, operation is successively performed to set the slot to the "free (idle)" state until all the slots used in the transmission have been initialized in this way.

Figure 6:
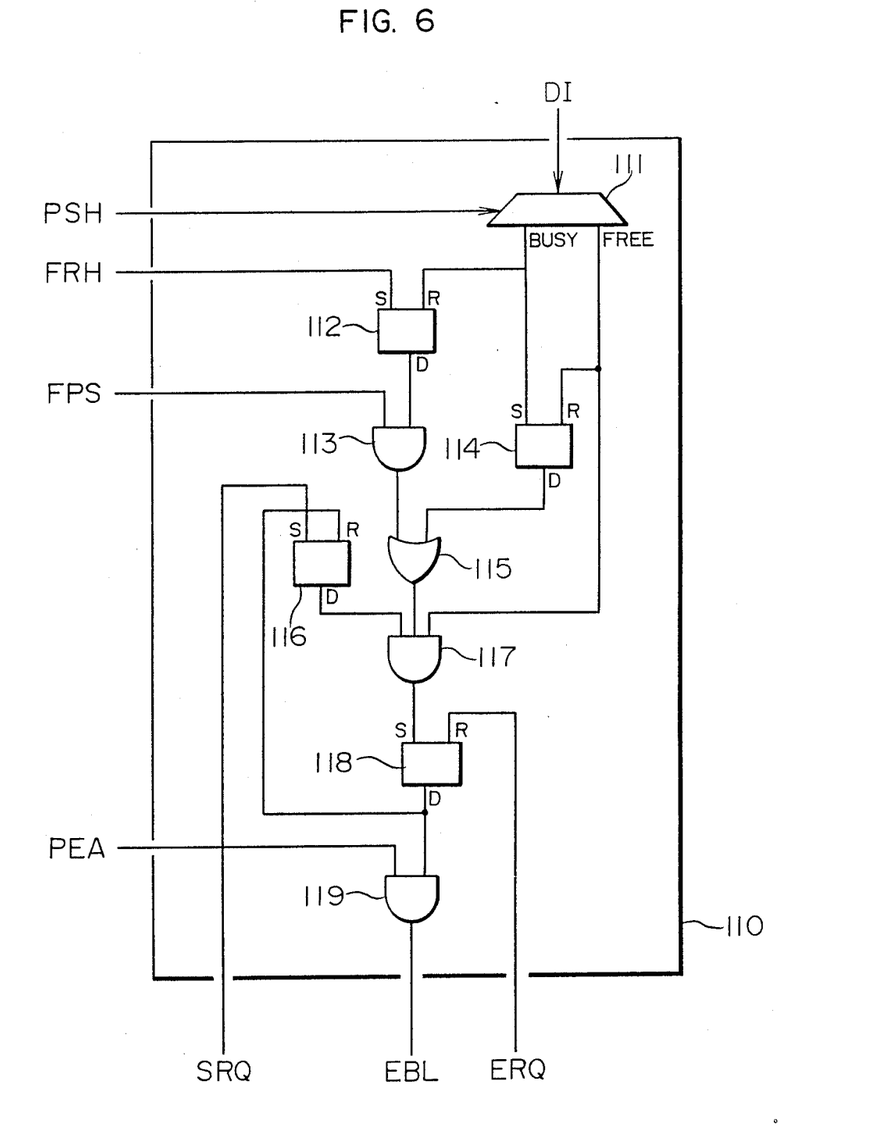
FIG. 6 is a view showing a hardware structure of a transmission access control circuit (110) constituting a part of the access controller shown in FIG. 5.

FIG. 6 shows, by way of example, a hardware structure of the transmission access control circuit 110 which the present invention concerns among others. In the figure, reference numerals 112, 114, 116 and 118 denote memory circuits for storing various control states, respectively. The memory may be constituted by a flip-flop. Operations of these memories are as follows:

(1) Memory 116

The memory 116 stores a signal indicating the state in which a request to send information is being issued but the right of transmission is not acquired yet. This state constitutes one of the conditions for acquisition of the right of transmission. This memory or flip-flop is set by a send request command SRQ from a transmission buffer control circuit 160, while it is reset upon acquisition of the right of transmission.

(2) Memory 118

The memory 118 indicates the state in which the right of transmission has been acquired. So long as this state is set, a transmission enabling signal EBL can be generated for allowing the information to be sent out from the transmission buffer control circuit 160. This state is set when the right of transmission is acquired and reset by a transmission end command ERQ supplied from the transmission buffer control circuit 160.

(3) Memory 114

The memory 114 stores the information indicating detection of the packet slots being used. More specifically, this memory is employed for detecting one of the conditions for acquiring the right of transmission that the packet slot preceding immediately to the "free" packet slot as detected is being used (i.e. in "busy" state). The memory 114 is set upon detection of the busy packet slot and reset after detection of the free packet slot.

(4) Memory 112

This memory stores the absence of the busy packet slots in a transmitting frame. More specifically, the memory 112 is used for detecting one of the conditions for acquiring the right of transmission that upon detection of a free packet slot, no busy packet slot makes appearance at the time point preceding to the detected free packet slot by one transmission frame on the assumption that the slot competent for the acquisition of the right of transmission is located at the position of the first packet slot in the transmission frame (the time slot $TS_3$ in the case of the example shown in FIG. 1). The memory or flip-flop 112 is reset by a signal FRH indicative of detection of the frame header, while being reset upon detection of the busy packet slot.

When a decoder 111 detects that the current packet slot is free and that the immediately preceding packet slot is in the busy state, the condition for the memory 118 to be set is validated through the memory 114, an OR gate 115 and an AND gate 117. On the other hand, when it is detected that the leading packet slot is free and that no busy packet slot is present in the immediately preceding transmission frame, the condition for setting the memory (flip-flop) 118 is validated by way of the memory 112, and an AND gate 113, the OR gate 115 and the AND gate 117. The communication enabling signal EBL is produced in dependence on the logical product of the output of the memory 118 and a burst information transmitting area designating timing signal PEA through and AND gate 119.

Figure 7:
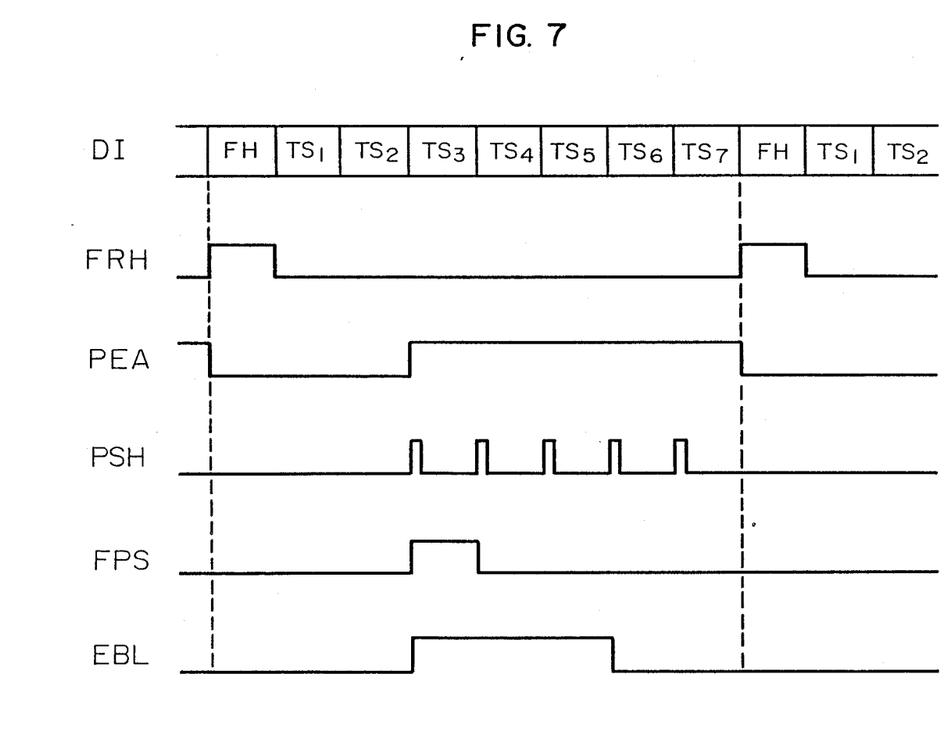
FIG. 7 is a timing chart showing waveforms of signals making appearance in the transmitting (sending) operation.

FIG. 7 is a waveform diagram illustrating signals generated in the transmitting operation described above by reference to FIG. 6 by taking as an example the transmission frame shown in FIG. 1. The signals include those mentioned below.

DI: Signal representative of the contents of information transferred through the receiving bus 104.

FRH: Signal indicating the position of the frame header.

PEA: Signal indicating the slot area for transmitting the burst information (packet).

PSH: Signal indicating the header position of the packet slot.

FPS: Signal indicating the position of the leading packet slot in the frame to be transmitted.

EBL: Transmission enabling signal applied to the gate 140 (FIG. 5) for enabling the output operation to the transmitting bus 105.

The signals FRH, PEA, PSH and FPS are supplied from the reception access control circuit 120.

What is claimed is:

1. A multi-slot access method for transmitting information on an annular transmitting apparatus having a ring-like transmission path realized by interconnecting serially a plurality of transmission stations in an annular form, at least one of said transmissions stations generating repetitively a transmitting signal referred to as a transmission frame which includes a plurality of transmission units referred to as time slots, said frame being circulated along said transmission path, wherein transmission of information among transmission stations is performed in such a manner in which each of said transmission stations having a request to send information divides said information into a plurality of information units and inserts each of said information units in a time slot, said information units being received by the transmission station destined to receive said information, said multi-slot access method comprising the steps of:

providing with each of said time slots an area which includes an indicator for indicating whether the associated time slot is "free" or "busy"; and determining in a transmission station having a request to send information that sending of said information is enabled when it is detected that one time slot located at a particular position within said frame is "free" or when it is detected that the time slot succeeding immediately to a "busy" slot is "free", to thereby set successively those usable time slots which succeed to said detected "free" time slot to the "busy" state and insert said information units in said usable time slots; or permitting, when there is a free slot detected after a specified slot in a transmission frame before said request to send information, information having a continuous format occupying successive time slots of a next transmission frame to be inserted in said free time slots; and permitting, when there is a busy slot detected before said request to said information immediately after said busy slot, information having a continuous format occupying successive time slot to be inserted in said free time slots.

2. A multi-slot access method according to claim 1, wherein the determination, performed by the determining step, that the sending of information is permitted is confirmed when no "busy" time slot has been previously detected within a period equal to a time required for said information units to be transmitted completely around said ring-like transmission path.

* * * * *